United States Patent [19]

Jinnai

[11] Patent Number: 5,339,173
[45] Date of Patent: Aug. 16, 1994

[54] IMAGING APPARATUS HAVING OBJECT PLATE AND VARIABLY POSITIONABLE IMAGE SENSOR

[75] Inventor: Shigeru Jinnai, Kanagawa, Japan

[73] Assignee: Canon Kabushiki Kaisha, Tokyo, Japan

[21] Appl. No.: 161,207

[22] Filed: Dec. 2, 1993

Related U.S. Application Data

[63] Continuation of Ser. No. 620,062, Nov. 29, 1990, abandoned.

[30] Foreign Application Priority Data

Dec. 5, 1989 [JP] Japan .................................. 1-314309
Dec. 27, 1989 [JP] Japan .................................. 1-336496

[51] Int. Cl.⁵ .............................................. H04N 1/04
[52] U.S. Cl. .................................... 358/471; 358/475; 358/479
[58] Field of Search ............... 358/471, 474, 475, 479, 358/494, 229, 29, 400; H04N 1/04

[56] References Cited

U.S. PATENT DOCUMENTS

| | | | |
|---|---|---|---|
| 4,916,550 | 4/1990 | Miyake et al. | 358/471 |
| 4,939,580 | 7/1990 | Ishikawa et al. | 358/471 |
| 4,958,241 | 9/1990 | Ohtomo et al. | 358/496 |
| 5,010,420 | 4/1991 | Hasegawa et al. | 358/471 |
| 5,027,219 | 6/1991 | Stuttler et al. | 358/229 |

FOREIGN PATENT DOCUMENTS 3-29568 2/1991 Japan .

*Primary Examiner*—Edward L. Coles, Sr.
*Assistant Examiner*—Kim Yen Vu
*Attorney, Agent, or Firm*—Robin, Blecker Daley & Driscoll

[57] ABSTRACT

In an image input device having an image placing board for placing thereon an image to be read, an image sensing part which reads the image, a supporting part arranged to support the image sensing part in such a manner that the position of the image sensing part relative to the image placing board is variable, an adjusting part arranged to adjust the image sensing part and an illumination part arranged to illuminate the image, a control part is arranged to cause the adjusting part to operate when the position of the image sensing part changes and to cause the illumination part to be turned off when the degree of change of the position of the image sensing part relative to the image placing board exceeds a given degree.

15 Claims, 7 Drawing Sheets

IMAGING APPARATUS HAVING OBJECT PLATE AND VARIABLY POSITIONABLE IMAGE SENSOR

This is a continuation application under 37 CFR 1.62 of prior application Ser. No. 620,062, filed Nov. 29, 1990, now abandoned.

BACKGROUND OF THE INVENTION

1. Field of the Invention

This invention relates to an image input device and more particularly to an image sensing means and an illumination device of the image input device.

2. Description of the Related Art

The conventional image input device of the kind having an image placing board on which an image to be read is placed, an image sensing part which photoelectrically converts the image, a support body which carries the image sensing part, an illumination device for illuminating the image, a white balance adjusting mechanism for adjusting white balance and an image sensing distance adjusting mechanism for adjusting an image sensing distance has been arranged as follows: In reading the image on the image placing board, the image is read by the image sensing part by illuminating the image with the illumination device and by photoelectrically converting the image. In this instance, the illumination device is turned on and off by means of an on/off switch.

The white balance adjusting mechanism and the image sensing distance adjusting mechanism are arranged to operate when applicable operation members are operated.

With the conventional device arranged in this manner, it has been necessary to operate the white balance adjusting mechanism and the image sensing distance adjusting mechanism again by operating the operation members when the support body is moved to change the position of the image sensing part relative to the image placing board.

Further, since the illumination device is arranged to be turned on and off by means of the on/off switch, the illumination cannot be automatically extinguished and thus must be extinguished by manually operating the on/off switch when the facing direction of the image sensing part is shifted away from the image placing board by moving the support body of the image sensing part.

SUMMARY OF THE INVENTION

This invention is directed to the solution of the above-stated problems of the conventional device. It is, therefore, an object of the invention to provide an image input device which excels in operability and is capable of retaining an appropriate state thereof by actuating white balance adjusting means and image sensing distance adjusting means when the position of image sensing means varies relative to an image placing board.

To attain this object, an image input device which embodies this invention and is of the kind having an image placing board for placing thereon an image to be read, image sensing means for reading the image, support means for carrying the image sensing means, white balance adjusting means for adjusting white balance and image sensing distance adjusting means for adjusting an image sensing distance is provided with control means, which is arranged as follows: When the position of the image sensing means relative to the image placing board is changed by moving the support means, the control means controls the white balance adjusting means and the image sensing distance adjusting means to cause them to operate according to the change.

In the image input device according to the invention which is arranged as described above, the white balance adjusting means and the image sensing distance adjusting means are thus caused by the control means to operate when the position of the image sensing means is changed by moving the support means.

It is another object of the invention to provide an image input device which is arranged to give improved operability by controlling illumination means in such a way as to forcibly turn off the illumination means when the facing direction of image sensing means changes away from an image placing board.

To attain that object, an image input device which embodies this invention as another embodiment thereof and is of the kind having an image placing board for placing thereon an image to be read, image sensing means for reading the image, support means for carrying the image sensing means and illumination means for illuminating the image is provided with control means which is arranged to control the illumination means in such a way as to forcibly turn off the illumination means when the facing direction of the image sensing means changes away from the image placing board.

The above-stated arrangement thus enables the image input device to turn off the illumination means by the control means when the facing direction of the image sensing means comes to deviate from the image placing board.

These and other objects and features of the invention will become apparent from the following detailed description of embodiments thereof taken in connection with the accompanying drawings.

DETAILED DESCRIPTION OF THE PREFERRED EMBODIMENTS

Figure 1:
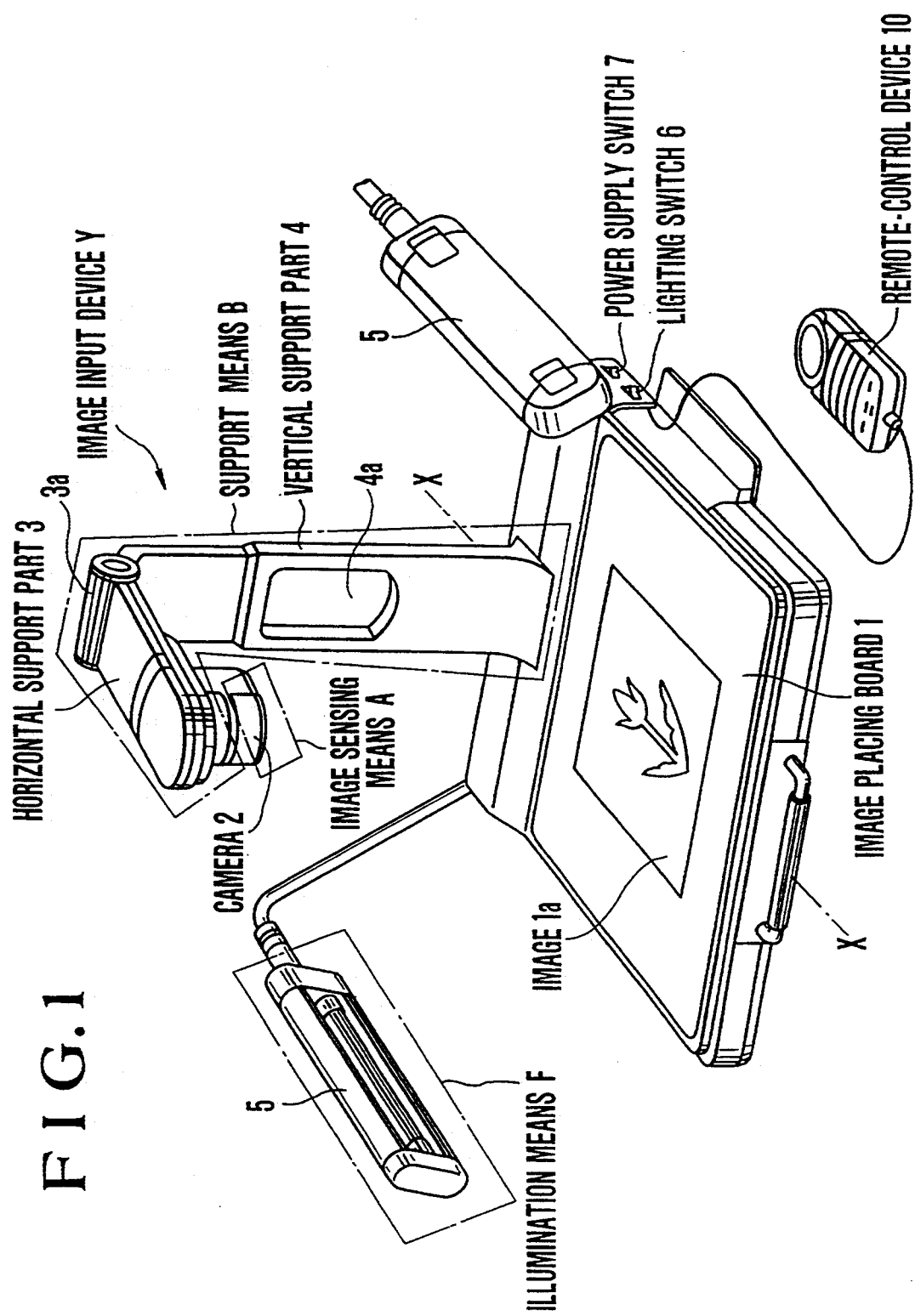
FIG. 1 is an oblique view showing an image input device arranged as an embodiment of this invention.
Figure 2:
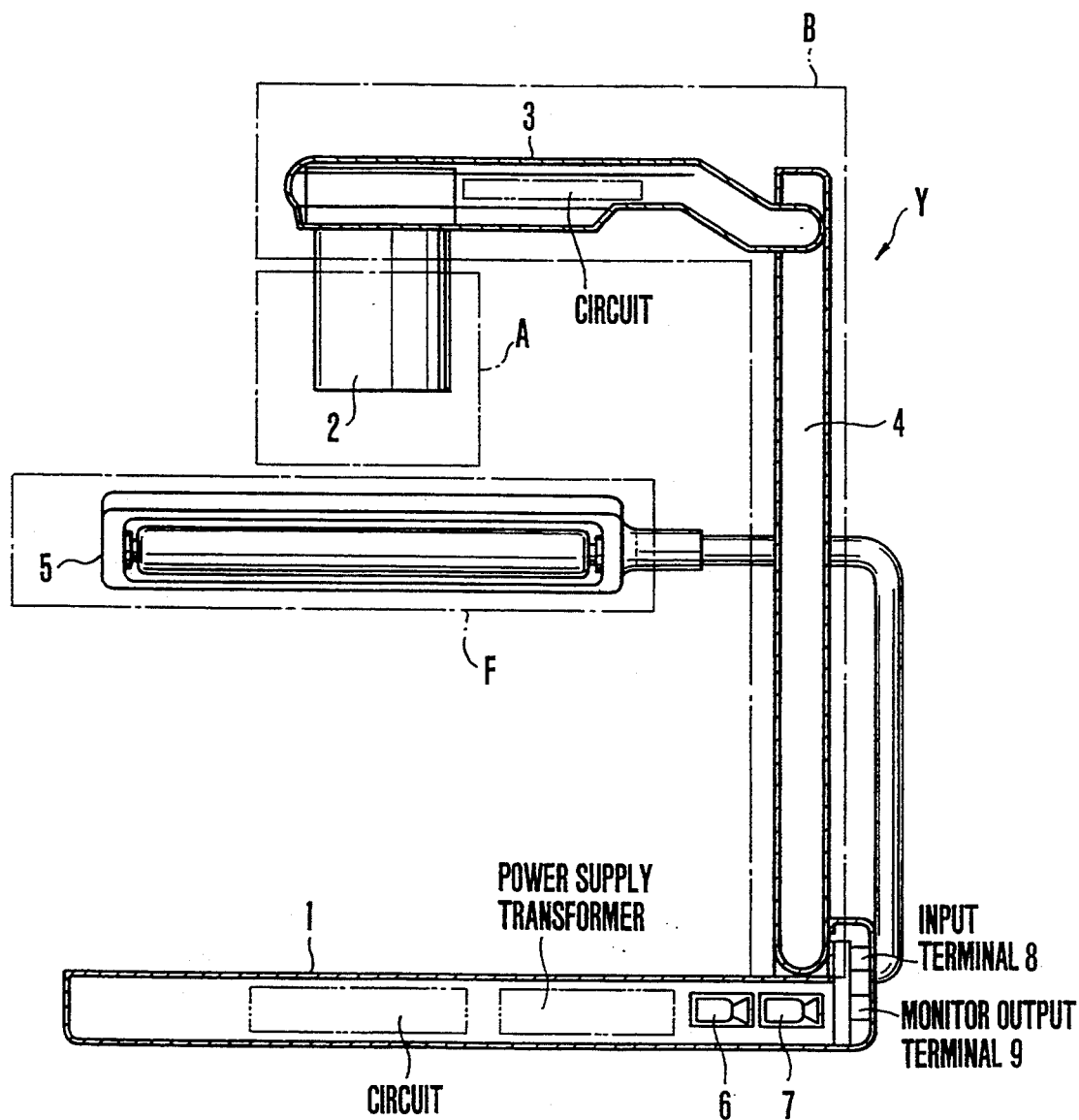
FIG. 2 is a sectional view taken along a line X—X of FIG. 1.

The following describes an embodiment of this invention with reference to the accompanying drawings:

The outline of arrangement of this embodiment is first described with reference to FIGS. 1 and 2. In FIG. 1, a reference symbol Y denotes an image input device. A reference numeral 1 denotes an image placing board which is arranged to place thereon an image 1a to be read. To prevent an irregular reflection of light incident on a camera 2 from the image placing board 1, the image placing board 1 is provided with a diffusing surface. The camera 2 is secured to and carried by a horizontal support part 3 and is provided with a color photo-electric conversion part which is an image sensing means A and photo-electrically converts the image 1a. A vertical support part 4 is secured to the image placing board 1. The length in the vertical direction of the vertical support part 4 is variable. The horizontal support part 3 is connected to the image placing board 1 via the vertical support part 4 and is turnable around a connection (hinge) part 3a which is provided for connection to the vertical support part 4. The horizontal and vertical support parts 3 and 4 jointly form a support means B for supporting the image sensing means A. In the middle part in the longitudinal direction of the vertical support part 4, is provided a hole 4a. When the horizontal support part 3 is turned counterclockwise as viewed in FIG. 1, the image sensing means A comes to be fit into the hole 4a to become usable for shooting in the rearward direction as viewed in FIG. 1. Illumination devices 5 are disposed, as illumination means F, above and on both sides of the image placing board 1 and are arranged to be used when the surface of the image placing board 1 is dark. A switch 6 is arranged to turn on and off the illumination devices 5. The image input device Y is further provided with a power supply switch 7 for power supply; and an external input terminal 8 ( FIG. 2 ) for receiving a video signal from the outside. The external input received by the external input terminal 8 is output from a monitor output terminal 9. A reference numeral 10 denotes a remote-control device which is arranged to electrically control and operate various operation members provided on the image input device Y. In this case, the remote-control device 10 is connected to the body of the image input device Y by means of a cord. However, this may be changed to a wireless arrangement.

Figure 3:
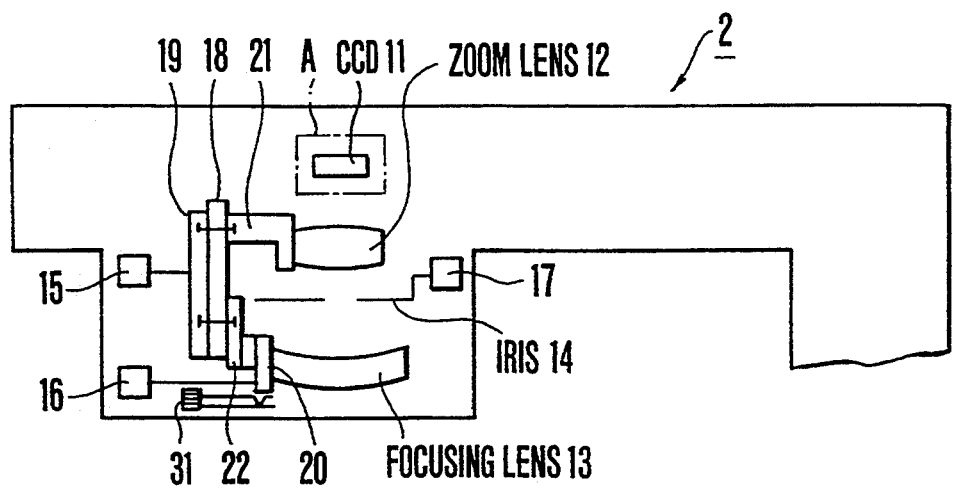
FIG. 3 is a sectional view showing one side of a camera 2 of FIG. 1.

FIG. 3 shows in a sectional view one side of the camera 2. In FIG. 3, a reference numeral 11 denotes a CCD ( charge-coupled device ) which is employed as the image sensor of the above-stated image sensing means A. The image 1a placed on the image placing board 1 ( FIG. 1 ) comes to the image sensor CCD 11 through a zoom lens 12 and a focusing lens 13 which serves as an image sensing distance adjusting means D. The zoom lens 12 is secured to a moving tube 21 and is arranged to be driven by a motor 15 through a cam tube 19. The focusing lens 13 is mounted on a focus frame 20 and is secured to a moving tube 22. A motor 16 is arranged to drive the focusing lens 13. An iris 14 is arranged to be driven to open and close by another motor 17. A stationary tube 18 is secured to the horizontal support part 3 (FIG. 1). The moving tubes 21 and 22 and the cam tube 19 are rotatably mounted on the stationary tube 18.

Figure 4:
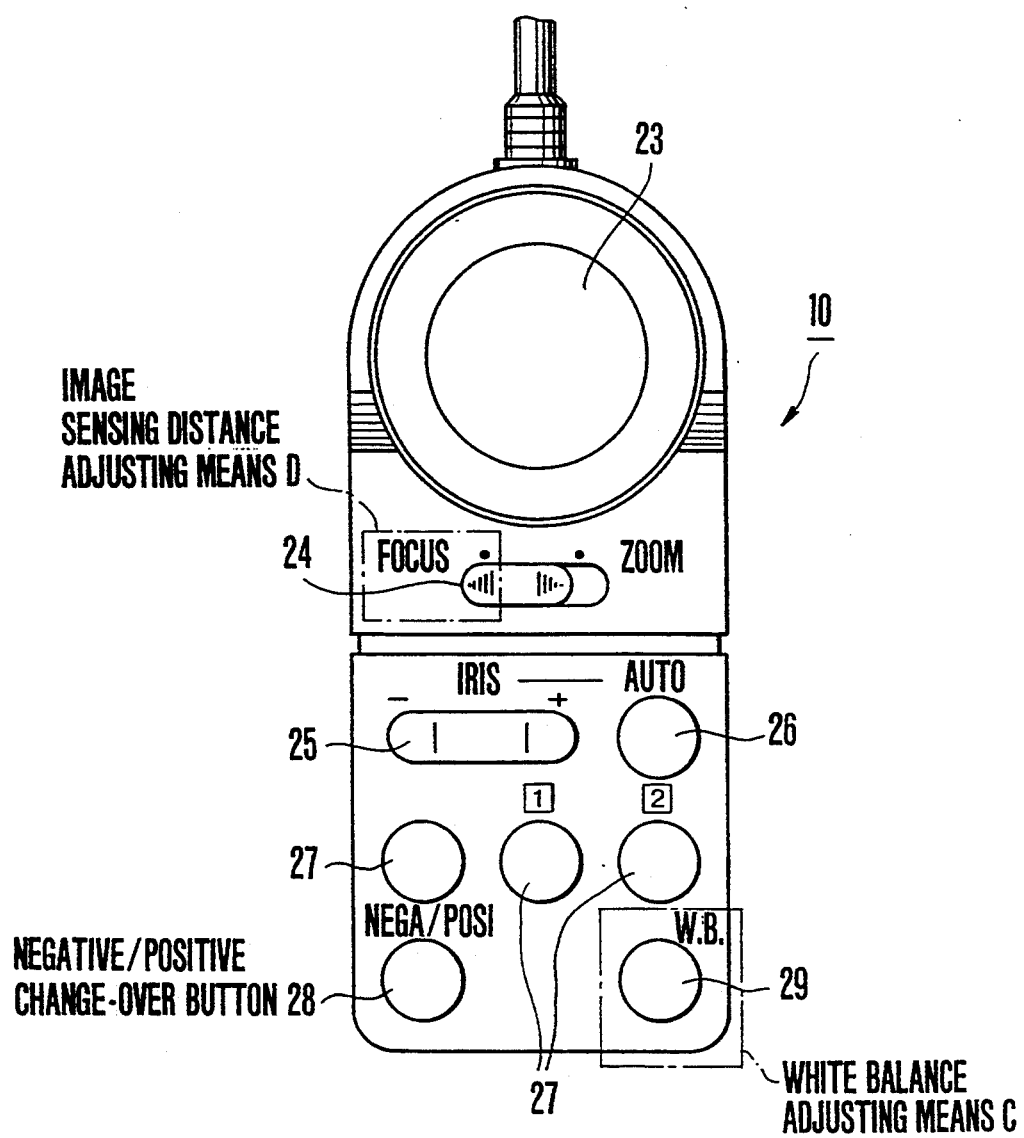
FIG. 4 is a top view showing the operation part of a remote-control device 10 of FIG. 1.

The remote-control device 10 of FIG. 1 is provided with an operation part which is arranged as shown in FIG. 4. FIG. 4 shows the upper surface of the operation part of the remote-control device 10. The illustration includes a focus/zoom adjusting rotary dial 23; and a control switch 24 which is provided for controlling the dial 23 and is arranged to be selectively set either in a focus position or a zoom position. In the case of the illustration, the switch 24 is set in the focus position. An iris (diaphragm) button 25 is arranged to open the aperture of the iris when the button 25 is pushed on its plus side and to close the iris when it is pushed on its minus side. Further, the iris can be automatically controlled by pushing an automatic iris button 26. An input change-over switch 27 is provided for selection of an input from the above-stated external input terminal 8 (FIG. 2) or an input from the camera 2. A numeral 28 denotes a negative/positive change-over button. A white balance adjusting button 29 is provided for a white balance adjusting means C. The white balance adjusting means C operates while this button 29 is being pushed. When the button 29 is released from being pushed, the white balance remains in a state obtained at the time of the release.

Figure 5:
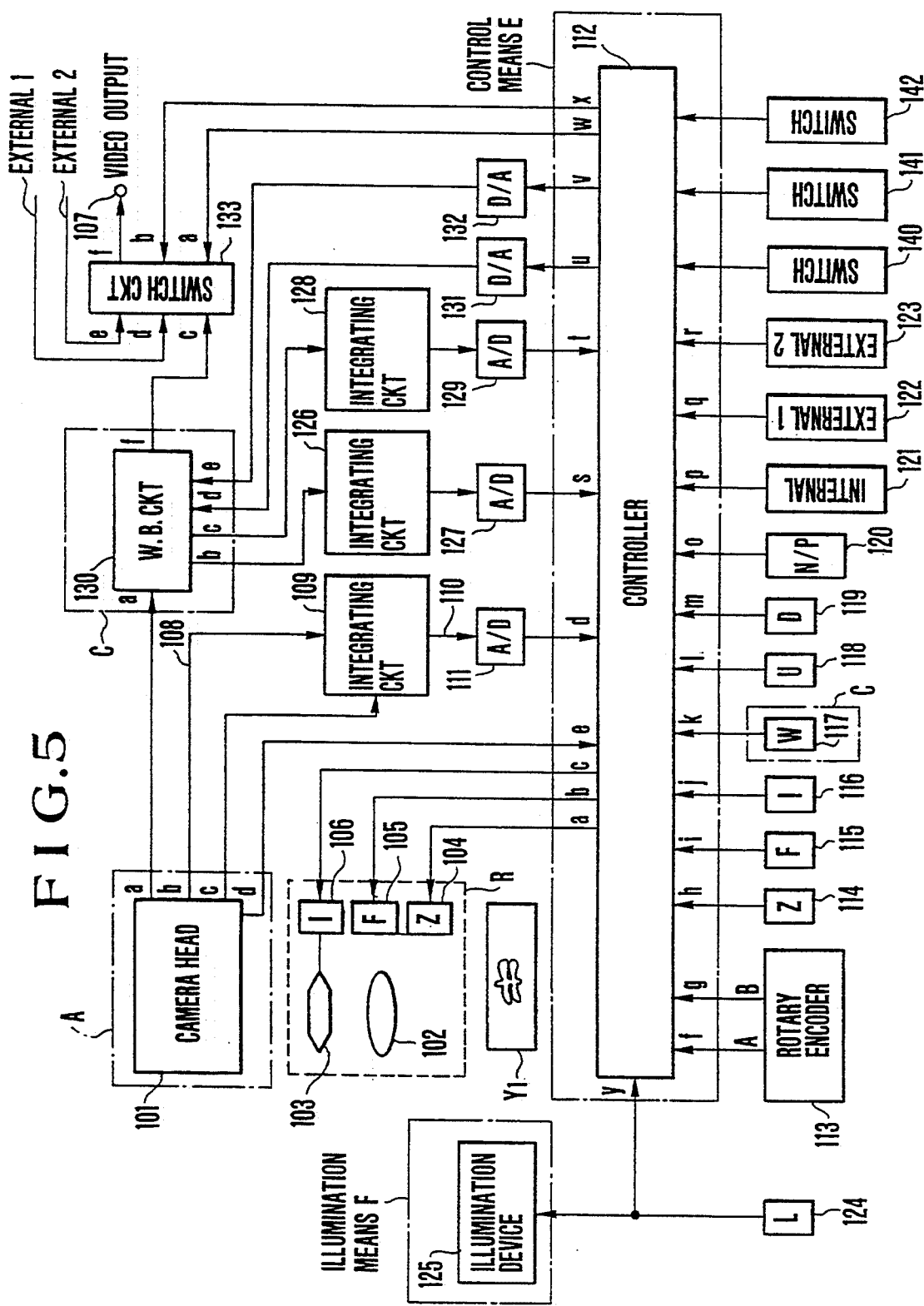
FIG. 5 is a diagram showing the arrangement of the same embodiment.
Figure 6:
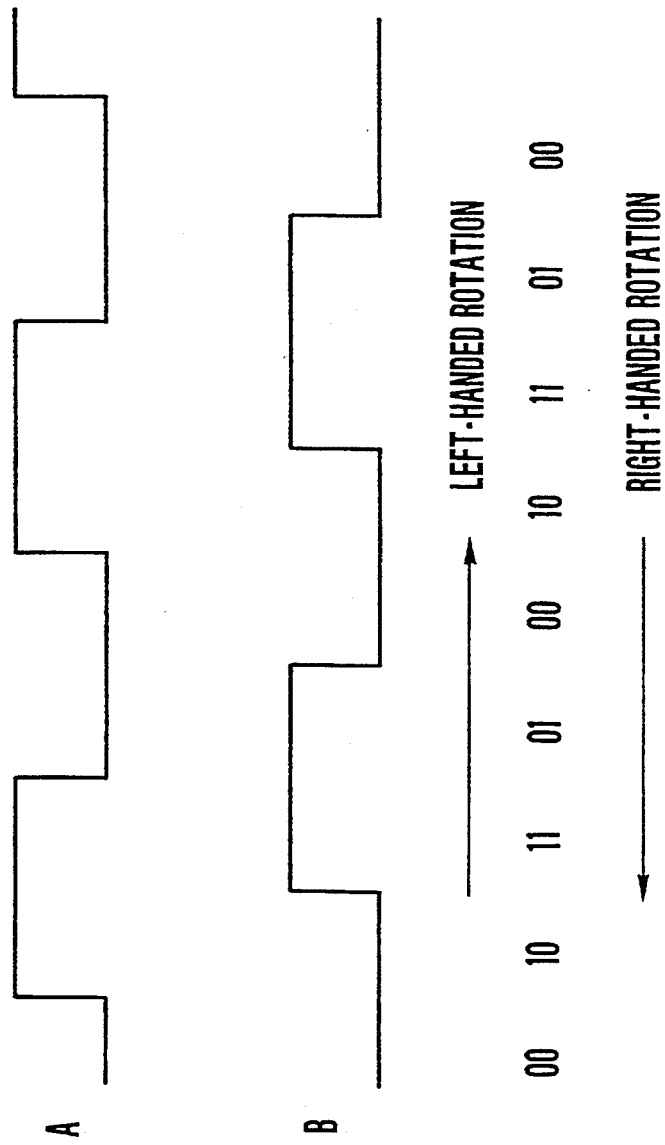
FIG. 6 is a waveform chart showing the signals output from a rotary encoder 113 of FIG. 5.

Next, referring to FIGS. 5 and 6, the arrangement of this embodiment is further described with importance attached to the control system thereof. FIG. 5 shows the arrangement in a block diagram. A camera head 101 is provided for sensing the image of an object Y1. A lens R is mounted in front of the camera head 101 and is arranged to form the image of the object Y1 on the image sensor CCD disposed within the head 101. The lens R consists of a plurality of zoom optical lenses 102, an iris 103, a zoom adjusting motor 104, a focusing motor 105 and an iris adjusting motor 106. These motors 104, 105 and 106 are elements which are capable of converting electrical energy into mechanical energy, such as a DC motor, a stepping motor, an ultrasonic motor or the like. They are mechanically movable in opposite directions in response to instructions from a controller 112. In accordance with the instructions to move forward or backward, the zoom adjusting motor 104 performs a "telephoto" or "wide-angle" lens position obtaining action, the focusing motor 105 a "near" or "far" focus adjusting action and the iris adjusting motor 106 an aperture "opening" or "closing" action for zooming, focusing and adjustment of the amount of exposure respectively.

Information on the image of the object Y1 from the camera head 101 is output as a video signal conforming to the NTSC system or the like through a white balance (W.B.) circuit 130 which is the white balance adjusting means C, a switch circuit 133 and an output terminal 107. At the same time, the camera head 101 outputs a luminance signal from its terminal b for the purpose of detecting the average luminance of the object Y1. The luminance signal is supplied via a line 108 to an integrating circuit 109 to be integrated there. The integrated luminance signal is A/D (analog-to-digital) converted into a digital signal by an A/D converter 111. The digital luminance signal is supplied to a controller 112 which serves as the control means E and is arranged to control the whole system. In accordance with the luminance signal, the controller 112 forms control signals for automatic adjustment of the position of the iris and that of the focusing lens and supplies the control signals to the adjusting motors.

Further, the camera head 101 sends out, from its terminal c, a sync signal to the integrating circuit 109 to give the reset timing of integrating waveform. The camera head 10 1 also sends out, from its terminal d, a timing pulse signal to the controller 112 to designate timing for taking signals therein. A rotary encoder 113 corresponds to the rotary dial 23 (FIG. 4) provided for focus/zoom adjustment. The two output terminals A and B of the rotary encoder 113 are connected to the controller 112. Referring to FIG. 6 which is a waveform chart showing the waveforms of signals output from the rotary encoder 113, when the encoder 113 a right-handed rotation, the output of the rotary encoder 113 varies as follows:

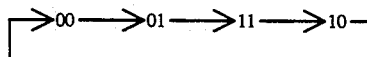

When the encoder 113 makes a left-handed rotation, the output of the rotary encoder 113 varies as follows:

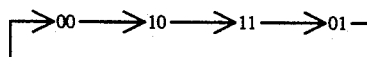

This enables the controller 112 to detect the rotating direction through inputs A and B received from the rotary encoder 113.

Members 114, 115 and 116 are arranged to give instructions for zooming, focusing and aperture adjusting actions respectively. For example, when the output level of any of them becomes high, the controller 112 considers the applicable action to be designated. Further, two or more actions cannot be simultaneously designated. In accordance with the right-handed or left-handed rotation of the rotary encoder 113, the controller 112 operates to make telephoto or wide-angle zooming if zooming is designated, to make near- or far-focus adjustment if focusing is designated or to open or close the aperture of the iris if aperture adjustment is designated.

A member 117 included in the white balance adjusting means C corresponds to the white balance adjusting button 29 of FIG. 4 and is arranged to issue an instruction for automatic white balance adjustment. The white balance adjusting action is performed, for example, when the input from this member 117 is at a high level and, when the input level becomes low, the white balance state obtained at that point of time is retained.

Up- and down-operation members 118 and 119 which correspond to the plus side and the minus side of the iris button 25 of FIG. 4 are arranged as follows: The controller 112 operates to cause the iris 103 to open (up action) when the level of input from the up-operation member 118 becomes high and to close (down action) when the level of input from the down-operation member 119 becomes high.

A negative/positive change-over member 120 is arranged to cause the controller 112 to change a negative mode over to a positive mode and vice versa every time the level of input from the member 120 becomes high.

Input change-over operation members 121, 122 and 123 are arranged to cause the controller 112 to select, in response to input from any of them, all applicable one of inputs c, d and e to the switch circuit 133 via the input lines a or b of the switch circuit 133 and to output the selected input from the above-stated output terminal 107. A light-up/put-out operation member 124 corresponds to the lighting switch 6 of FIG. 1 and is arranged to inform the controller 112 of the state of the switch. A reference numeral 125 denotes an illumination device which corresponds to the illumination means F of FIG. 1 and is arranged to illuminate the image placing board 1.

An integrating circuit 126 is arranged to integrate a signal B-Y (blue - luminance) output from the white balance circuit 130 which is the white balance adjusting means C. An A/D (analog-to-digital) converter 127 is arranged to A/D convert the output of the integrating circuit 126 and to supply the result of the conversion to the controller 112. Another integrating circuit 128 is arranged to integrate a signal R-Y (red—luminance) output from the white balance circuit 130. An A/D converter 129 is arranged to A/D convert the output of the integrating circuit 128 and to supply the result of the A/D conversion to the controller 112. A D/A (digital-to-analog) converter 131 is arranged to D/A convert a B (blur) control value output from the controller 112 and to supply it to the white balance circuit 130. Another D/A converter 132 is arranged to D/A convert an R (red) control value output from the controller 112 and to supply it to the white balance circuit 130.

The white balance circuit 130 which is the white balance adjusting means C is arranged to make white balance adjustment on the basis of the control values of B and R obtained from the controller 112. The switch circuit 133 is arranged to select one of the inputs c, d and e under the control of the controller 112 and to output it to the video output terminal 107.

A switch 140 is disposed at the vertical support part 4 and is arranged to turn on when the vertical support part 4 is in a state of having its length invariably locked and to turn off when the vertical support part 4 is unlocked. A switch 141 is disposed at the connection part 3a between the horizontal support part 3 and the vertical support part 4 and is arranged to turn on when the horizontal support part 3 is in a state of being non-rotatably locked and to turn off when the horizontal support part 3 is released from the nonrotatably locked state.

A switch 142 is disposed at the connection part 3a between the horizontal and vertical support parts 3 and 4 and is arranged to be in an on-state while the image sensing means A is facing the image placing board 1, that is, while the image placing board 1 is within the angle of view of the image sensing means A and to be in an off-state while the facing direction of the image sensing means A is deviating from the image placing board 1.

Next, control over the white balance adjustment and focusing lens is described below referring to FIG. 7 with importance attached to the control means E:

The control means E which executes the flow of operation described below is formed by the controller 112 (FIG. 5) and is arranged to control the white balance adjusting means C and the image sensing distance adjusting means D when the position of the image sensing means A relative to the image placing board 1 is changed by moving the support means B.

Figure 7:
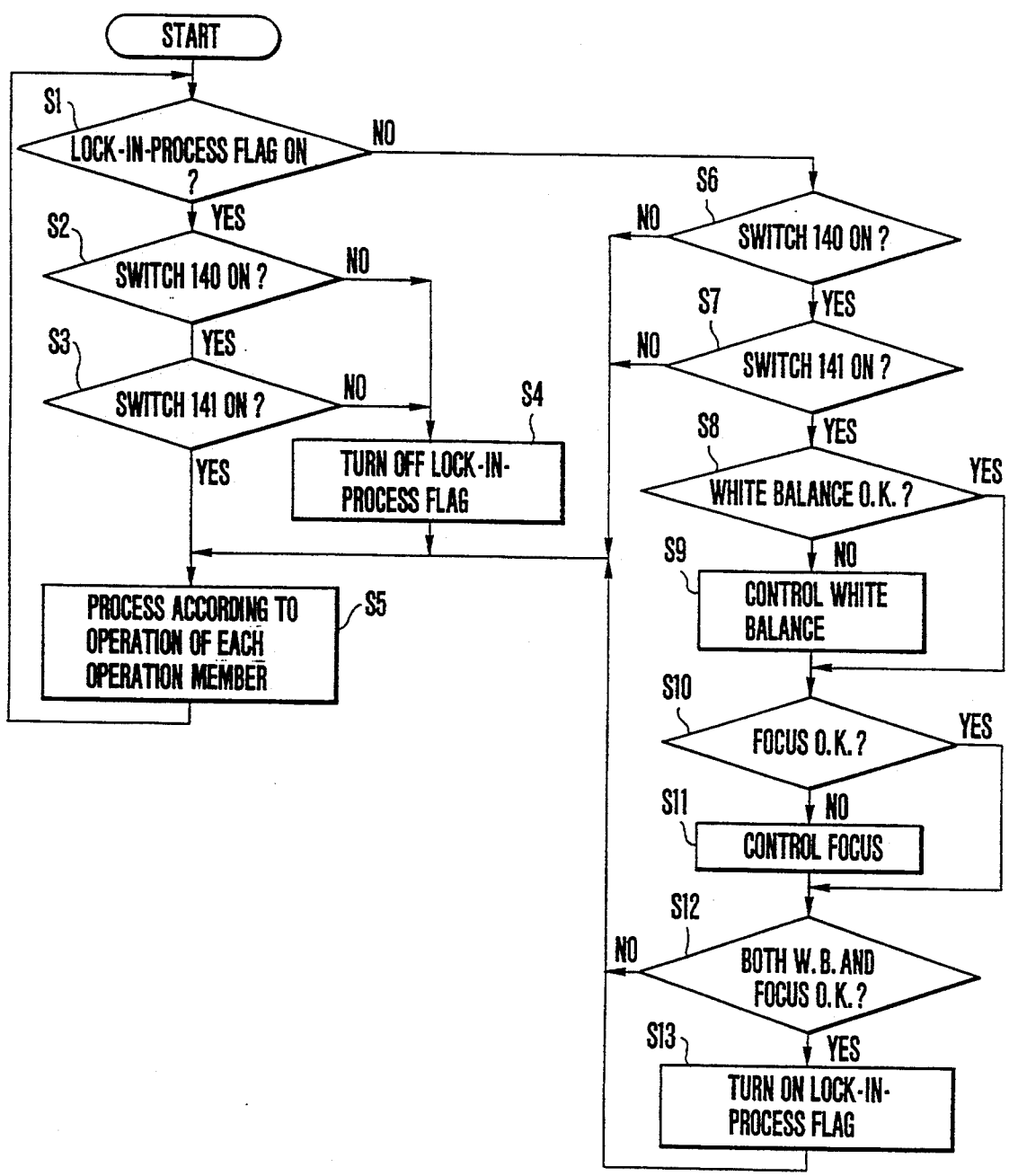
FIG. 7 is a flow chart showing the operation of control means for controlling the image sensing means in this embodiment.

Referring to FIG. 7 which is a flow chart, the image input device Y is initialized when the power supply is turned on before a step S1. At the step S1: After completion of the initializing process, a flag which indicates that the support parts 3 and 4 are respectively in their locked states is checked to find if the flag is on. If the flag is on, the flow of operation proceeds to a step S2. At the step S2: A check is made for the locked state of the vertical support part 4. In other words, the switch 140 is checked to find if it is in an on-state. If the vertical support part 4 is thus found to be in the locked state, the flow proceeds to a step S3. At the step S3: The switch 141 is checked for its on-state to find if the horizontal support part 3 is in the locked state. If the horizontal support part 3 is thus found to be in the locked state, the flow comes to a step S5.

If the vertical and horizontal support parts 4 and 3 are found to be not in the locked states at the steps S2 and S3 respectively, the flow proceeds to a step S4. At the step S4: The flag indicating the locked state of the support parts is turned off. The flow then comes to a step S5. At the step S5: A process corresponding to the operation of any of the operation members is executed and the flow comes back to the step S1.

At the step S1, if the flag which indicates that the support parts are being locked is found to be off, the flow comes to a step S6. At the step S6: A check is made for the locked state of the vertical support part 4 by checking the switch 140 to find if it is in its on-state. If not, the flow comes to the step S5. If the vertical support part 4 is thus found to be in the locked state, the flow proceeds to a step S7.

At the step S7: A check is made for the locked state of the horizontal support part 3 by checking the switch 141 to find if it is in its on-state. If not, the flow comes to the step S5. If the horizontal support part 3 is thus found to be in the locked state, the flow proceeds to a step S8. At the step S8: A check is made for the white balance. If the white balance is found to be adequate, the flow comes to a step S10. If not, the flow comes to a step S9. At the step S9: Control over the white balance adjustment is executed and the flow proceeds to the step S10. At the step S10: A check is made for the focus. If the focus is found to be adequate, the flow comes to a step S12. If not, the flow comes to a step S11. At the step S11: Focus control is performed and the flow comes to the step S12. At the step S12: A check is made to find if both the white balance and the focus are adequate. If not, the flow comes to the step S5. If both the white balance and the focus are adequate, the flow proceeds to a step S13. At the step S13: The flag which indicates that the support parts are locked is turned on and the flow of operation comes to the step S5.

Figure 8:
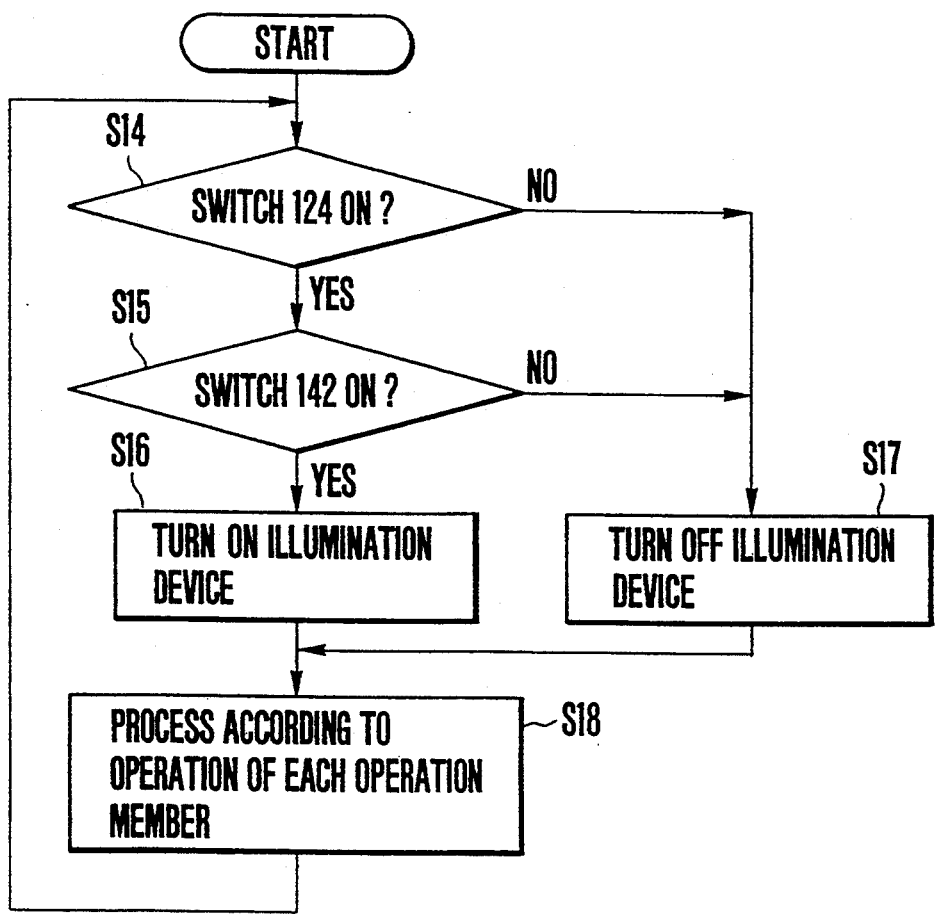
FIG. 8 is a flow chart showing the operation of control means for controlling the illumination means in the same embodiment.

Next, control over the operation of the illumination means is described referring to FIG. 8 with importance attached to the operation of the control means E. In the flow of operation described below, the control means E forcibly turns off the illumination means F in a case where the facing direction of the image sensing means A is caused to deviate from the image placing board 1 by moving the support means E.

Referring to FIG. 8 which is a flow chart, the image input device Y is initialized when the power supply is turned on before a step S14. At the step S14: After completion of the initializing process, a check is made to find if the lighting switch 124 (FIG. 5) of the illumination device is in an on-state. If so, the flow proceeds to a step S15. At the step S15: A check is made to find if the camera 2 is facing the image placing board 1. For this purpose, the switch 142 (FIG. 5) is checked for its on-state. If the camera 2 is thus found to be facing the image placing board 1, the flow proceeds to a step S16. At the step S16: The illumination device 125 is turned on if its light is found to be extinguished, or it is left turned on if its light is found to be energized. The flow then comes to a step S18.

In a case where the lighting switch 124 is found to be in an off-state at the step S14, the flow comes to a step S17. If the camera 2 is found not facing the image placing board 1 at the step S15, that is, if the switch 142 is found to be in its off-state, the flow comes to the step S17. At the step S17: The illumination device 125 is turned off if its light is found to be energized, or it is left turned off if its light is found to be extinguished. The flow then comes to a step S18. At the step S18: A process corresponding to the operation of any of the operation members is executed and the flow comes back to the step S14.

In the case of this embodiment, the controller 112 is arranged to perform control by reading the state of the switch 142. However, the control can be likewise performed without recourse to the controller 112 by arranging the switch 142 between the switch 124 and the controller 112 or between the controller 112 and the illumination device 125.

In accordance with this invention, the white balance adjusting means and/or the image sensing distance adjusting means is actuated in the event of occurrence of any change in the position of the image sensing means relative to the image placing board; and the illumination device is forcibly turned off when the facing direction of the image sensing means comes to deviates from the image placing board. The invented arrangement improves the operability of the image input device and keeps it in an adequate state.

What is claimed is:
1. An image input device, comprising:
 a) an object plate on which an object to be read is placed;
 b) image sensing means for sensing an image of said object and outputting an image signal,
  wherein said image sensing means includes an optical system for picking up said object as an optical image;
 c) support means for supporting said image sensing means in such a way that the position of said image sensing means relative to said object plate is variable;
 d) detecting means for detecting a change in position of said image sensing means relative to said object plate; and
 e) control means for controlling said image sensing means,
  wherein said control means is arranged to control whether or not an adjusting operation of said image sensing means is to be effected in response to an output of said detecting means.

2. A device according to claim 1, wherein said optical system includes a focusing lens and said control means is arranged to control said focusing lens.

3. A device according to claim 1, further comprising white balance adjusting means for adjusting a white balance of the image signal output from said image sensing means,
 wherein said control means is arranged to control whether or not an adjusting operation of said white balance adjusting means is to be effected in response to the output of said detecting means.

4. A device according to claim 1, further comprising:
 a) illumination means for illuminating said object; and
 b) illumination control means for controlling said illumination means in such a way that illuminating operation of said illumination means is prohibited when said image sensing means does not face said object plate during operation of said image sensing means.

5. An image input device comprising:
 a) an object plate on which an object to be read is placed;
 b) image sensing means including an optical system for picking up said object as an optical image and a photoelectric converting part for converting the optical image picked up by said optical system into an electrical signal;

c) support means for supporting said image sensing means in such a way that the position of said image sensing means relative to said object plate is variable;

d) detecting means for detecting a change in position of said image sensing means relative to said object plate; and e) control means for controlling said optical system, wherein said control means is arranged to control whether or not an adjusting operation of said optical system is to be effected in response to an output of said detecting means.

6. An image input device comprising:

a) an object plate on which an object to be read is placed;

b) image sensing means including an optical system for picking up said object as an optical image and photoelectric converting part for converting the optical image picked up by said optical system into an electrical signal, wherein said optical system includes a focusing lens;

c) support means for supporting said image sensing means in such a way that the position of said image sensing means relative to said object plate is variable;

d) detecting means for detecting a change in position of said image sensing means relative to said object plate; and e) control means for controlling said optical system by using an output of said detecting means, wherein said control means is arranged to control said focusing lens and whether or not an autofocusing operation is to be effected in response to the output of said detecting means.

7. An image input device, comprising:

a) an object plate on which an object to be read is placed;

b) image sensing means for sensing an image of said object and for outputting an image signal;

c) support means for supporting said image sensing means in such a way that the position of said image sensing means relative to said object plate is variable;

d) illumination means for illuminating said object; and e) illumination control means for controlling said illumination means in such a way that illuminating operation of said illumination means is prohibited when said image sensing means does not face said object plate during operation of said image sensing means.

8. A device according to claim 7, further comprising:

a) detecting means for detecting a position varying operation of said support means; and b) adjusting means for adjusting a color balance of an image signal output from said image sensing means, by using an output of said detecting means.

9. An image input device comprising:

a) an object plate on which an object to be read can be placed;

b) image sensing means for sensing an image of said object and outputting an image signal;

c) support means for supporting said image sensing means in such a manner that the position of said image sensing means relative to said object plate is variable;

d) illumination means for illuminating said image; and e) control means for controlling said illumination means in such a way as to turn off said illumination means when the degree of change of the position of said image sensing means exceeds a predetermined degree during operation of said image sensing means.

10. A device according to claim 9, wherein said image sensing means includes a CCD as an image sensor.

11. A device according to claim 9, wherein said support means includes a vertical support part which supports said image sensing means vertically relative to said object plate and a horizontal support part which supports said image sensing means horizontally relative to said object plate.

12. A device according to claim 11, said horizontal support part is arranged to be tunable around a connection part which is disposed between said horizontal support part and said vertical support part.

13. A device according to claim 9, wherein said predetermined degree is a degree according to which said object plate deviates from the angle of view of said image sensing means.

14. A device according to claim 9, wherein said control means includes detecting means for detecting a change in the position of said image sensing means relative to said object plate.

15. An image input device comprising:

a) an object plate on which an object to be read is placed;

b) image sensing means for sensing an image of said object and outputting an image signal;

c) color balance adjusting means for adjusting a color balance of the image signal output from said image sensing means;

d) support means for supporting said image sensing means in such a way that the position of said image sensing means relative to said object plate is variable;

e) detecting means for detecting a change in position of said image sensing means relative to said object plate; and f) control means for controlling said color balance adjusting means, wherein said control means is arranged to control whether or not an adjusting operation of said color balance adjusting means is to be effected in response to the output of said detecting means.

* * * * *

UNITED STATES PATENT AND TRADEMARK OFFICE
CERTIFICATE OF CORRECTION

PATENT NO. : 5,339,173
DATED : August 16, 1994
INVENTOR(S) : Shigeru Jinnai

It is certified that error appears in the above-identified patent and that said Letters Patent is hereby corrected as shown below:

Col. 4, line 57.   Change "10 1" to -- 101 --.

Col. 4, line 66.   After "113" insert -- is --.
    Col. 5, line 51.   Change "all" to -- an --.
    Col. 6, line 28.   Change "nonrotatably" to -- non-rotatably --.

Col. 8, line 16.   Delete "comes to".

Col. 10, line 26.  Change "tunable" to -- turnable --.

Signed and Sealed this

Twenty-seventh Day of December, 1994

Attest:

BRUCE LEHMAN

*Attesting Officer*     *Commissioner of Patents and Trademarks*